United States Patent
Amann et al.

(10) Patent No.: US 11,204,792 B2
(45) Date of Patent: Dec. 21, 2021

(54) ATTACHING STORAGE RESOURCES TO VIRTUAL MACHINE INSTANCES

(71) Applicant: INTERNATIONAL BUSINESS MACHINES CORPORATION, Armonk, NY (US)

(72) Inventors: Stefan Amann, Boeblingen (DE); Walter Niklaus, Jettingen (DE); Linda-Marie Weber, Beuerberg (DE); Matthias Lukas Chavanne, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 16/049,992

(22) Filed: Jul. 31, 2018

(65) Prior Publication Data

US 2019/0310873 A1     Oct. 10, 2019

(30) Foreign Application Priority Data

Apr. 4, 2018    (EP) .................................... 18165583

(51) Int. Cl.
*G06F 9/46*     (2006.01)
*G06F 9/455*    (2018.01)

(52) U.S. Cl.
CPC .................... *G06F 9/45558* (2013.01); *G06F 2009/45562* (2013.01); *G06F 2009/45579* (2013.01); *G06F 2009/45583* (2013.01); *G06F 2009/45595* (2013.01)

(58) Field of Classification Search
CPC ....... G06F 2009/45562; G06F 9/45558; G06F 2009/45579; G06F 2009/45583; G06F 2009/45595
See application file for complete search history.

(56) References Cited

U.S. PATENT DOCUMENTS

| | | | |
|---|---|---|---|
| 7,757,007 B2 | 7/2010 | Banzahf et al. | |
| 8,041,987 B2 | 10/2011 | Allen et al. | |
| 8,275,886 B1 | 9/2012 | Galan | |
| 9,740,520 B1 * | 8/2017 | Sarda | G06F 9/45558 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

*Primary Examiner* — Camquy Truong
(74) *Attorney, Agent, or Firm* — Steven Chiu, Esq.; Blanche E. Schiller, Esq.; Heslin Rothenberg Farley & Mesiti P.C.

(57) ABSTRACT

A data processing system includes one or more computer systems, each executing at least one hypervisor. Host bus adapters on the computer system are connectable to storage resources in at least one storage area network. The at least one hypervisor provides virtual instances of the host bus adapters as virtual host bus adapters, and a world-wide unique port number and a logical unit number are used to access a storage volume. A globally unique identifier is used to identify the storage volume. The system includes a management server comprising a management instance for evaluating a possibility of attaching storage resources to virtual machine instances generated by the hypervisor.

20 Claims, 8 Drawing Sheets

(56) References Cited

U.S. PATENT DOCUMENTS

| | | | |
|---|---|---|---|
| 10,877,987 B2* | 12/2020 | Bingham | G06F 3/04847 |
| 2004/0205760 A1* | 10/2004 | Foote | G06F 11/28 |
| | | | 718/104 |
| 2012/0110515 A1* | 5/2012 | Abramoff | G06F 16/904 |
| | | | 715/854 |
| 2014/0173195 A1 | 6/2014 | Rosset et al. | |
| 2015/0007172 A1* | 1/2015 | Hudzia | G06F 9/45533 |
| | | | 718/1 |
| 2015/0106518 A1 | 4/2015 | Amann et al. | |
| 2015/0178019 A1* | 6/2015 | Hegdal | G06F 3/0665 |
| | | | 711/170 |
| 2016/0092271 A1* | 3/2016 | Jain | H04L 65/1069 |
| | | | 718/1 |
| 2016/0253205 A1 | 9/2016 | Friedrich et al. | |
| 2016/0255020 A1 | 9/2016 | Friedrich et al. | |
| 2016/0359905 A1* | 12/2016 | Touboul | H04L 63/1441 |
| 2017/0153832 A1 | 6/2017 | Amann et al. | |

* cited by examiner

ATTACHING STORAGE RESOURCES TO VIRTUAL MACHINE INSTANCES

This application claims priority from European patent application number EP18165583.8, filed Apr. 4, 2018, which is hereby incorporated herein by reference in its entirety.

BACKGROUND

One or more aspects relate in general, to data processing systems, and in particular, to attaching storage resources to virtual machine instances through storage area networks.

Network port names, also known as world-wide unique port names (WWPNs), and associated host bus adapters (HBAs), are part of the IEEE Fibre Channel Standard. Virtualization of Fibre Channel (FC) network ports allows sharing of physical FC ports by multiple operating systems by letting each operating system have its own world-wide unique port names. An operating system may receive access to logical units (LUN) through a small computer system interface (SCSI) target port in a storage area network (SAN) by using one or more WWPNs owned by the operating system. This capability architecturally allows multiple operating systems to share a physical FC port. One or multiple FC ports may be hosted on a single FC adapter. Multiple operating systems may share a server that has firmware and software capabilities to provide SCSI input/output (I/O) services to each operating system by virtualizing physical hardware.

SUMMARY

Shortcomings of the prior art are overcome and additional advantages are provided through the provision of a data processing system for attaching storage resources to virtual machine instances. The data processing system includes a memory, and a processor in communication with the memory, and is configured to perform a method. The method includes obtaining, by a management instance of a management server, a storage area network request for a group comprising at least one world-wide unique port number for one or more virtual host bus adapters. A virtual host bus adapter is a virtual instance of a host bus adapter of a computer system of the data processing system. The host bus adapter is to couple the computer system to one or more storage resources of one or more area networks. The at least one world-wide unique port number is to be used to access at least one storage resource of at least one storage area network. Based on the request, discovery is initiated for each world-wide unique port number of the at least one world-wide unique port number in the group on one or more host bus adapters of the computer system to collect information. The information collected is analyzed to determine availability of storage resources to attach to one or more virtual machine instances generated by a hypervisor of the computer system. Based on the analyzing, configuring of at least one virtual host bus adapter to attach one or more storage resources to at least one virtual machine instance of the one or more virtual machine instances is initiated (e.g., information is provided to configure).

In one embodiment, a request is obtained by the management instance on each startup of a virtual machine instance in order to optimize selection of host bus adapters for virtual host bus adapters of the virtual machine instance. The information collected is analyzed to determine a best available host bus adapter in dependence of path quality criteria.

The path quality criteria include, for instance, at least one of path redundancy and utilization of one or more host bus adapters.

In one example, the storage area network request includes information on storage requirements, including information on a number and storage size of storage resources to be requested.

In one aspect, it is automatically determined when the storage area network request has been fulfilled.

Further, the initiating discovering includes, for instance, triggering a discovery process through one or more host bus adapters for one or more virtual host bus adapters of a virtual machine instance.

In one embodiment, continuous monitoring is performed to determine changes in availability of a storage resource.

Further, in one embodiment, the hypervisor is alerted based on requirements of the storage area network request being fulfilled in the discovery.

As an example, the storage area network request is updated based on information on new virtual host bus adapters being provided to the management instance.

Discovery is periodically repeated, in one embodiment, to update information on one or more storage resources.

Moreover, in one embodiment, the storage area network request is obtained by the management instance from the hypervisor before a virtual machine instance is generated by the hypervisor.

Methods and computer program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of aspects of the invention. Moreover, the drawings are intended to depict only typical embodiments of the invention, and therefore, should not be considered as limiting the scope of aspects of the invention.

In one or more of the embodiments, a data processing system is provided that comprises one or more computer systems executing at least one hypervisor each, wherein host bus adapters on the computer system are, for example, permanently connectable to storage resources in at least one storage area network. The at least one hypervisor provides virtual instances of the host bus adapters as virtual host bus adapters, and a world-wide unique port number and a logical unit number are used to access a storage volume. The storage volume is identified, for instance, by its globally unique identifier (GUID).

The embodiments are sometimes described herein using particular technologies only as an example for the clarity of the description. The embodiments are used, as an example, for a data processing system characterized by a management server comprising a management instance for evaluating a possibility of attaching storage resources to virtual machine instances generated by the hypervisor. The management instance handles storage area network requests for a group comprising at least one world-wide unique port number for a virtual host bus adapter. In response of such a request, a discovery is performed for each world-wide unique port number in the group on each host bus adapter for virtual host bus adapters and the collected information is then analyzed to determine the availability of the corresponding storage resources.

A Fibre Channel protocol (FCP, SCSI over Fibre-Channel) provides for a very robust, fast, and scalable storage attachment. It is very commonly used in high-end server configurations and prevents the creation and allocation of storage resources from becoming cumbersome, and error-prone, particularly, for instance, when environments scale to tens, or hundreds of virtual servers.

The Fibre Channel standard is based upon world-wide unique port names (WWPNs) which are used for identifying virtual host bus adapters on the server side, and on the storage subsystem side. These WWPNs are, e.g., 16 hex-digit numbers. Server administration and SAN administration are usually performed by different individuals. The creation and allocation of storage resources involve communication between the server and the storage administrator. This includes the server administrator determining virtual host bus adapters (vHBAs) and associated host WWPNs to be used for a virtual server. Further, the server administrator determines the requirements for new storage resources. The server administrator talks to the storage administrator to determine where to allocate the new storage. The host WWPNs are handed over to the storage administrator. The storage administrator performs the configuration. The storage administrator determines the target WWPNs and logical unit numbers (LUNs) on the storage side that are to access the new storage.

The storage administrator hands over target WWPNs and LUNs to the server administrator. The server administrator configures target WWPNs and LUNs and validates the access.

Furthermore, the configuration may change—either deliberately, or inadvertently. The server administrator then is to detect this and to straighten out issues with the storage administrator.

According to an embodiment of the invention, the system allows the server administrator to create a request for new storage resources, in particularly for a group of host WWPNs. This request is based upon, e.g., storage access groups. The request is then sent to the storage administrator. The system automatically performs a discovery process for each host WWPN on each physical adapter, waiting for the requested storage resources to become available.

In one example, the system alerts the server administrator when storage resources matching the storage request appear, based upon host WWPNs.

The system updates the storage request, in one embodiment, providing address information of new LUN(s): target WWPNs, as well as LUN numbers, its size, and GUID.

The system provides a list of physical adapters providing access.

The system periodically updates, in one embodiment, the information by repeating the discovery process and informs the server administrator in case of changes, e.g., access lost.

In one embodiment of the invention, the server administrator picks a server with the ability to create vHBAs and performs a discovery process through physical host bus adapters (HBAs) for these vHBAs. The server administrator creates a group of vHBAs/WWPNs, or picks an existing group of vHBAs on that server. Then, the server administrator creates a storage request based upon the group of vHBAs/WWPNs together with storage requirements. The storage administrator receives the request and subsequently creates FCP LUNs and provides access for vHBAs with zoning and/or LUN masking.

The system automatically determines when the request has been fulfilled by triggering the discovery through the HBAs (e.g., all HBAs) for the WWPNs of the request. The system remembers the HBAs (e.g., all) with access to the LUNs. Then, the system notifies the server administrator.

The server administrator defines, for instance, a virtual server, and adds a group of vHBAs. The server administrator then activates the virtual server and vHBAs.

The server administrator or the system may have a large number of HBAs. Only some have access to the FCP LUNs. The server administrator or the system may then easily select the right ones based upon results from discovery.

In case of failures, or if SAN changes occur, advantages of an embodiment of the invention prevail over the state of the art, as in case of a failure of a physical path. The system monitors the LUNs for a group of WWPNs and automatically determines changes. For example, if access through one of the HBAs fails, or new paths become available. The system alerts the server administrator. The server administrator may then easily decide to move a vHBA to a different HBA.

Figure 1:
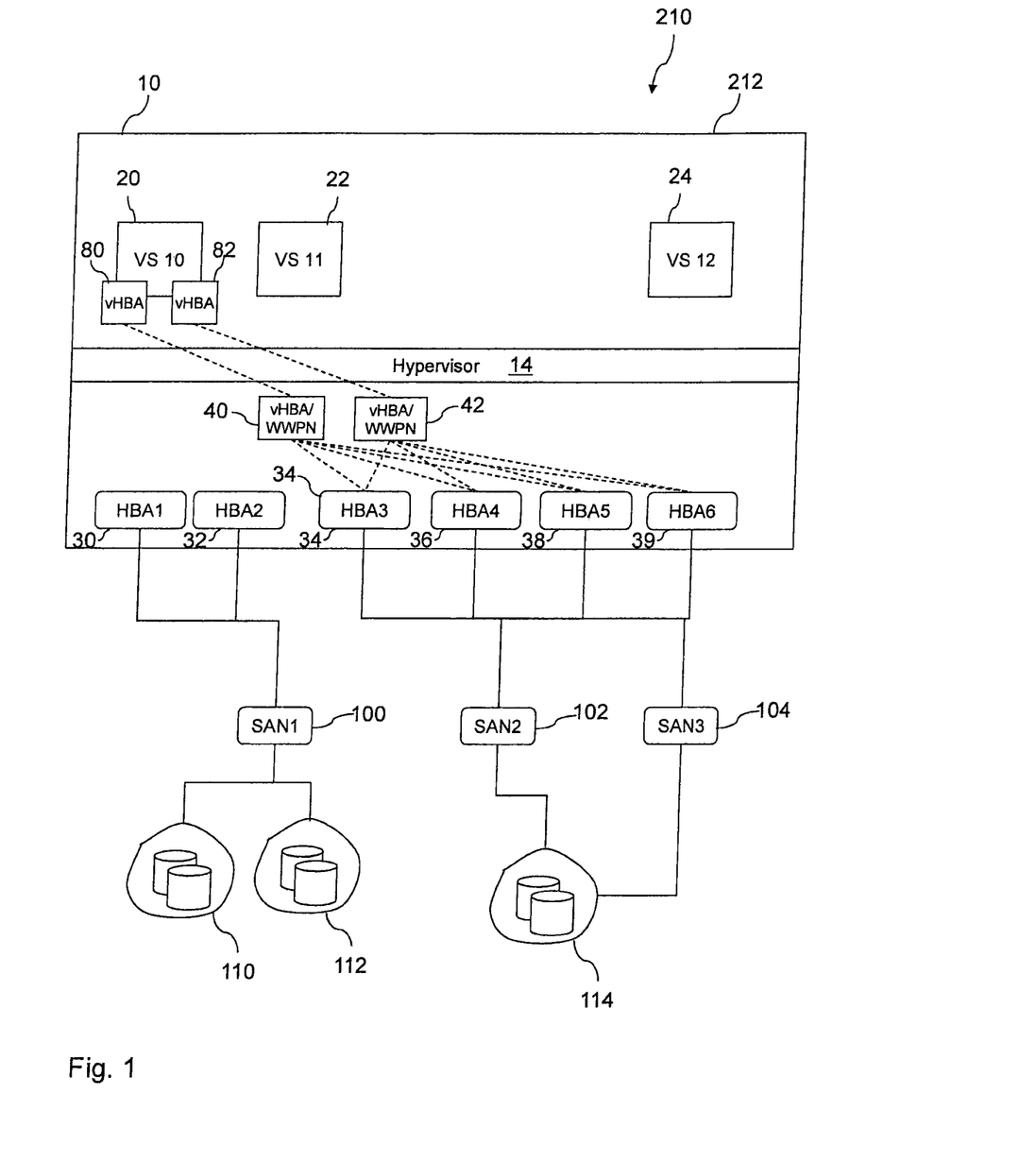
FIG. 1 depicts an overview of a network based data processing system for storage access through virtual host bus adapters according to an embodiment of the invention.

FIG. 1 depicts one example of an overview of a network based data processing system 210 for storage access through virtual host bus adapters 40, 42, 80, 82 according to an embodiment of the invention. A physical server 10 is shown, running a plurality of virtual servers 20, 22, 24 administrated by a hypervisor 14. The physical server 10 includes a plurality of host bus adapters 30, 32, 34, 36, 38, 39 acting as physical network ports to several storage area networks (SAN) 100, 102, 104, connected to the physical server 10 and providing access to a plurality of storage resources 110, 112, 114. The connection of the virtual server 20 to the networks 102, 104 via the host bus adapters 34, 36, 38, 39 is achieved by the hypervisor 14 providing virtual host bus adapters 40, 42 to virtual server 20. Virtual host bus adapters 80, 82 depict the view of these virtual host bus adapters 40, 42 from the virtual server 20.

Figure 2:
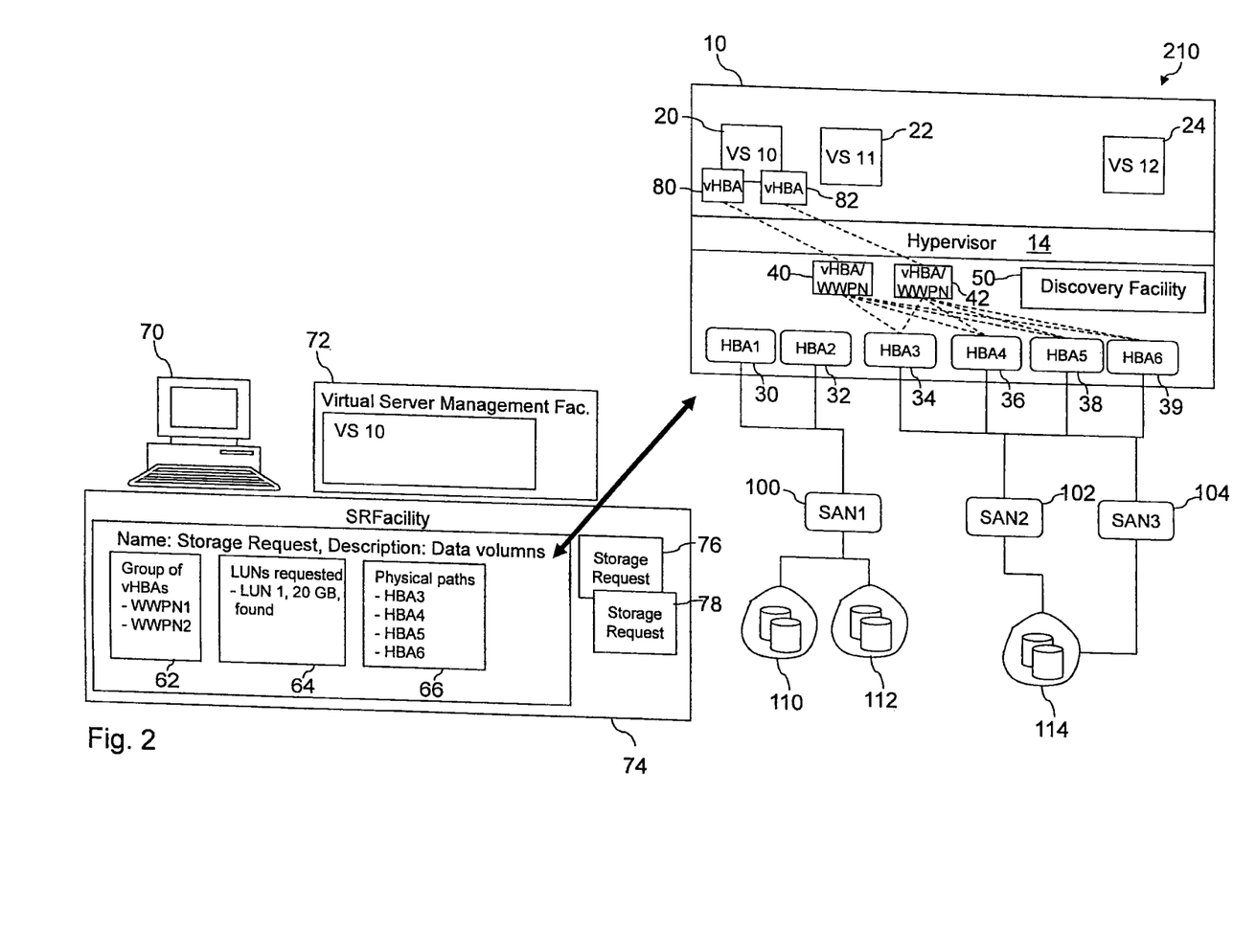
FIG. 2 depicts an overview of an implementation of an embodiment of the invention with a storage request facility for managing virtual host bus adapters.

FIG. 2 depicts one example of an overview of an implementation of an embodiment of the invention with a storage resource facility 74 for managing virtual host bus adapters 40, 42, 80, 82. FIG. 2 serves for demonstrating how a management console 70 as some high level management function of the system 210 is used for creating and providing access to a group of storage resources 110, 112, 114 for a virtual server 20 on a physical server 10, comprising a virtual server management facility 72 as a management server 72 and a storage request facility 74 as a management instance 74. The virtual server management facility 72 allows for managing virtual server definitions and activating, deactivating, and migrating virtual servers 20, 22, 24. The storage request facility 74 allows for managing virtual host bus adapters 40, 42, 80, 82, administrating world-wide unique port names WWPN1, WWPN2, . . . , creating, activating and deactivating virtual host bus adapters 40, 42, 80, 82. The virtual server 20, running on the physical server 10 is managed by the virtual server management facility 72.

The data processing system 210, shown in FIGS. 1 and 2, comprises, for instance, one computer system 212 executing the hypervisor 14, wherein host bus adapters 30, 32, 34, 36, 38, 39 on the computer system 212 are, in one example, permanently connectable to storage resources 110, 112, 114 in at least one storage area network 100, 102, 104. The hypervisor 14 provides virtual instances of the host bus adapters 30, 32, 34, 36, 38, 39 as virtual host bus adapters 40, 42, 80, 82 to one of the virtual servers 20, 22, 24. A world-wide unique port number 144 (FIG. 5) and a logical unit number 146 are used to access a storage volume 110, 112, 114. A GUID 138 is used to identify a storage volume 110, 112, 114.

In FIG. 2, the physical server 10 provides the ability to create/delete vHBAs and manage WWPNs. The server 10 further provides the ability to activate/shutdown/migrate virtual servers 20, 22, 24. It further comprises the discovery facility 50, providing the ability to perform a discovery on a physical HBA for a WWPN, independently, if it is in use, or not.

The management console 70 comprises the virtual server management facility 72 in order to be able to create/modify/delete/migrate virtual servers 20, 22, 24. Further, the system comprises the storage request facility 74 (SRF), which can be part of the management console 70.

If a user plans for new storage for the virtual server 20, the user, according to an embodiment of the invention, defines a storage request 76, 78 on the management console 70 and/or the storage request facility 74, specifying the name, description, as well as a group of vHBAs/WWPNs. The storage request facility 74 may contact the virtual server management facility 72 to get either existing, or new WWPNs. Further, the user defines, in one example, a number and size of LUNs.

The storage request facility 74 periodically calls the discovery facility 50 to perform discovery of all (or selected) WWPNs on all (or selected) physical adapters. The discovery facility 50 reports back results, including which storage resources (including their size, GUID, WWPNs/LUNs) are found on which adapter. The storage request facility 74 compares the results against the storage requests 76, 78, concerning the number and size of newly detected LUNs for WWPNs specified for a request. The storage request facility 74 notifies the user, including adapters that can be used for accessing the new LUNs.

In the embodiment shown in FIG. 2, the management server 72 comprises the management instance 74 for evaluating a possibility of attaching storage resources 110, 112, 114 to virtual machine instances 20, 22, 24 generated by the hypervisor 14. The management instance 74 handles storage area network requests for a group 62 comprising at least one world-wide unique port number for virtual host bus adapters 40, 42, 80, 82. In response of such a request, a discovery is performed for each world-wide unique port number 130 in the group 62 on each host bus adapter 30, 32, 34, 36, 38, 39. A discovery facility 50 is implemented on the computer system 212 for performing the discovery process. The collected information is then analyzed to determine the availability of the corresponding storage resources 110, 112, 114.

The virtual server management facility 72 submits a request to the management instance 74 on each startup of a virtual machine instance 20, 22, 24 in order to optimize the selection of host bus adapters 30, 32, 34, 36, 38, 39 for the virtual host bus adapters 40, 42, 80, 82 of the virtual machine instance 20, 22, 24. The management instance 74 further analyzes the collected information to also determine the best available host bus adapter 30, 32, 34, 36, 38, 39 in dependence of path quality criteria. Path quality criteria include, as examples, path redundancy and/or utilization of the host bus adapters 30, 32, 34, 36, 38, 39. The virtual server management facility 72 informs the hypervisor 14 on which physical host bus adapter a virtual host bus adapter is to be instantiated.

The requests comprise, in one example, information on storage requirements, in particular information on a number and storage size of storage resources 110, 112, 114. The management instance 74 automatically determines when the request has been fulfilled. The management instance 74 triggers a discovery process through the host bus adapters 30, 32, 34, 36, 38, 39 for the virtual host bus adapters 80, 82 of the virtual machine instance 20, 22, 24. A request is submitted, in one example, to the management instance 74 for a group 62 of virtual host bus adapters 40, 42, 80, 82. The management instance 74 alerts the hypervisor 14 in case all requirements of a request are fulfilled in the discovery process.

A continuous monitoring process may be performed for determining changes in an availability of storage volume 110, 112, 114. A request may be updated if information on new virtual host bus adapters 40, 42, 80, 82 is provided to the management instance 74. Therefore, in one example, the discovery process is periodically repeated for updating information on storage volume 110, 112, 114.

The request is submitted, in one example, to the management instance 74 by the hypervisor 14 before a virtual machine instance 20, 22, 24 is generated by the hypervisor 14.

Figure 3:
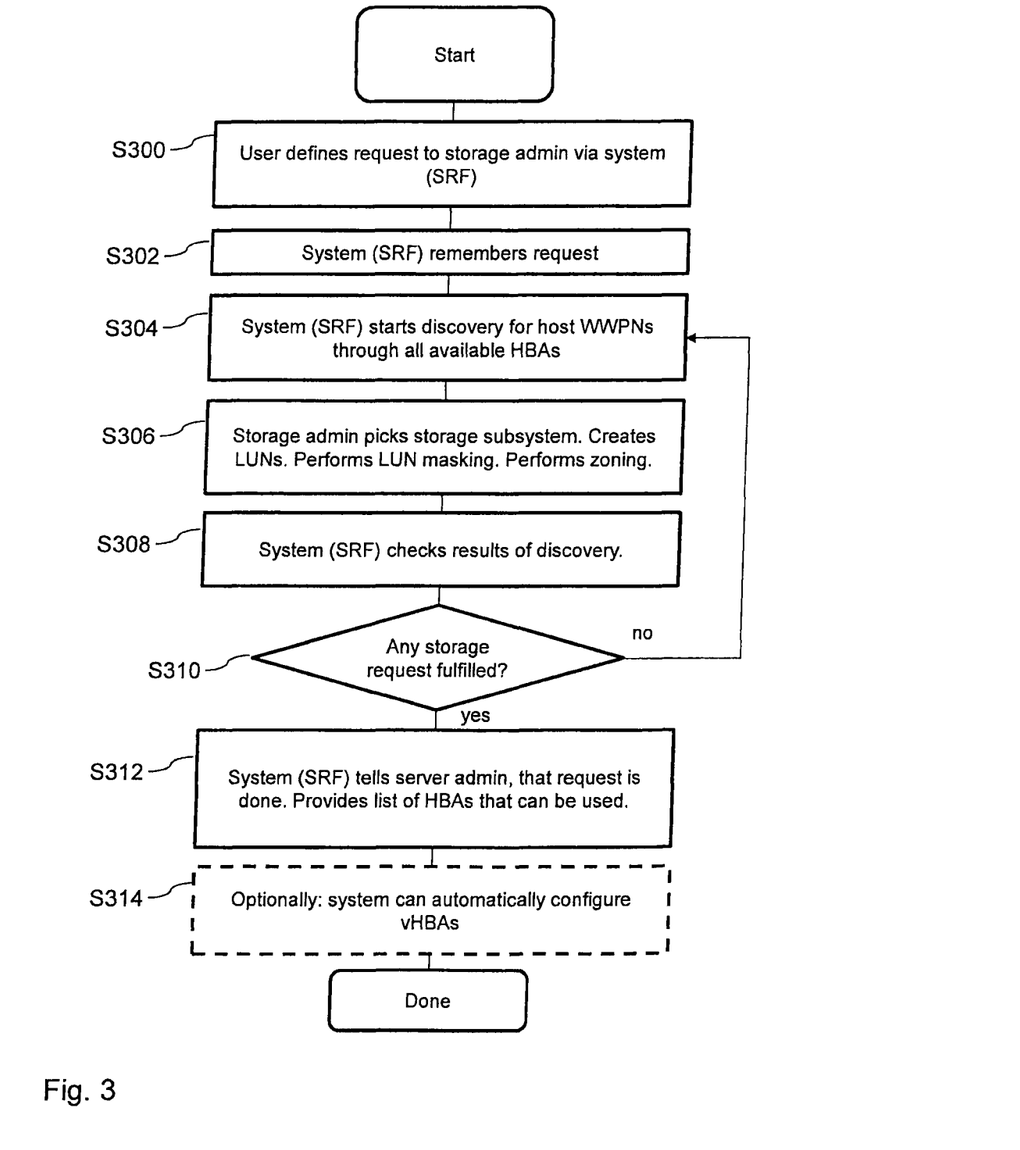
FIG. 3 depicts a flow chart for operating a computer system according to an embodiment of the invention.

FIG. 3 depicts one example of a flow chart for operating a computer system 212 for attaching storage resources 110, 112, 114 to virtual machine instances 20, 22, 24 according to an embodiment of the invention.

Numeral references used in the descriptions of FIGS. 3 to 7 refer to FIGS. 1 and 2.

The method is implemented, in one embodiment, on a data processing system 210 comprising one or more computer systems 212 executing at least one hypervisor 14 each. Host bus adapters 30, 32, 34, 36, 38, 39 on the computer system 212 are, e.g., permanently connectable to storage resources 110, 112, 114 in at least one storage area network 100, 102, 104. The at least one hypervisor 14 provides virtual instances of the host bus adapters 30, 32, 34, 36, 38, 39 as virtual host bus adapters 40, 42, 80, 82. A world-wide unique port number 144 (FIG. 5) and a logical unit number 146 are used to access a storage volume 110, 112, 114. A GUID 138 is used to identify a storage volume 110, 112, 114.

The method comprises a management server 72 comprising a management instance 74 evaluating a possibility of attaching storage resources 110, 112, 114 to virtual machine instances 20, 22, 24 generated by the hypervisor 14. The management instance 74 handles storage area network requests for a group 62 comprising at least one world-wide unique port number 130 for a virtual host bus adapter 40, 42, 80, 82.

In response of such a request, a discovery is performed for each world-wide unique port number 130 in the group 62 on each host bus adapter 30, 32, 34, 36, 38, 39 corresponding to identifiers for the virtual host bus adapters 40, 42, 80, 82 and the collected information is then analyzed to determine the availability of the corresponding storage resources 110, 112, 114.

The hypervisor 14 submits, in one example, a request to the management instance 74 on each startup of a virtual machine instance 20, 22, 24 in order to optimize the selection of host bus adapters 30, 32, 34, 36, 38, 39 for the virtual host bus adapters 40, 42, 80, 82 of the virtual machine instance 20, 22, 24. The management instance 74 further analyzes the collected information to also determine the best available host bus adapter 30, 32, 34, 36, 38, 39 in dependence of path quality criteria. The path quality criteria include, for instance, path redundancy and/or utilization of the host bus adapters 30, 32, 34, 36, 38, 39.

The requests include, e.g., information on storage requirements, in particular information on a number and storage size of storage resources 110, 112, 114. The management instance 74 automatically determines, in one embodiment, when the request has been fulfilled. The management instance 74 triggers a discovery process through the host bus adapters 30, 32, 34, 36, 38, 39 for the virtual host bus adapters 40, 42, 80, 82 of the virtual machine instance 20, 22, 24.

According to an embodiment of the invention depicted in FIG. 3, the user defines a request to a storage administrator via the storage request facility 74 in step S300. Next, in step S302, the storage request facility 74 remembers the request. In step S304, the storage request facility 74 starts the discovery process for the host world-wide unique port names (WWPNs) 130 through all (or selected) available host bus adapters (HBAs) 30, 32, 34, 36, 38, 39. Next, in step S306, the storage administrator picks a storage subsystem, creates logical unit numbers (LUNs) 146, performs LUN masking and zoning. In step S308, the storage request facility 74 checks the results of the discovery process. Then, in step S310, it is checked if any storage request 76, 78 is fulfilled. If this is not the case, the process returns to step S304 for restarting the discovery process. If the storage request 76, 78 is fulfilled, then the storage request facility 74 in step S312 tells the server administrator that the request is fulfilled and provides a list of host bus adapters 30, 32, 34, 36, 38, 39 that may be used. Optionally, in the step S314, the virtual server management facility 72 may automatically configure the virtual host bus adapters 40, 42, 80, 82.

Figure 4:
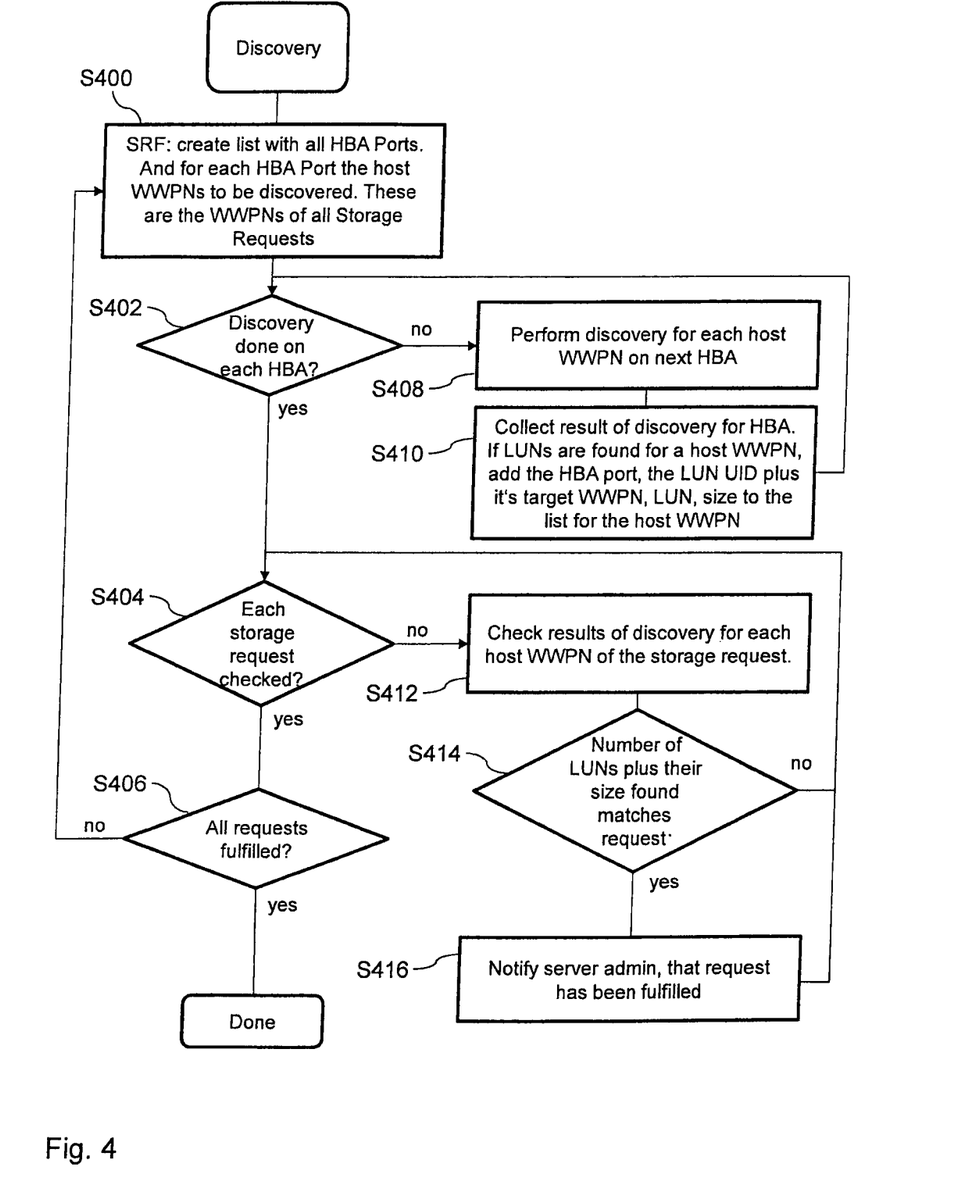
FIG. 4 depicts a flow chart for a discovery process according to an embodiment of the invention.
Figure 5:
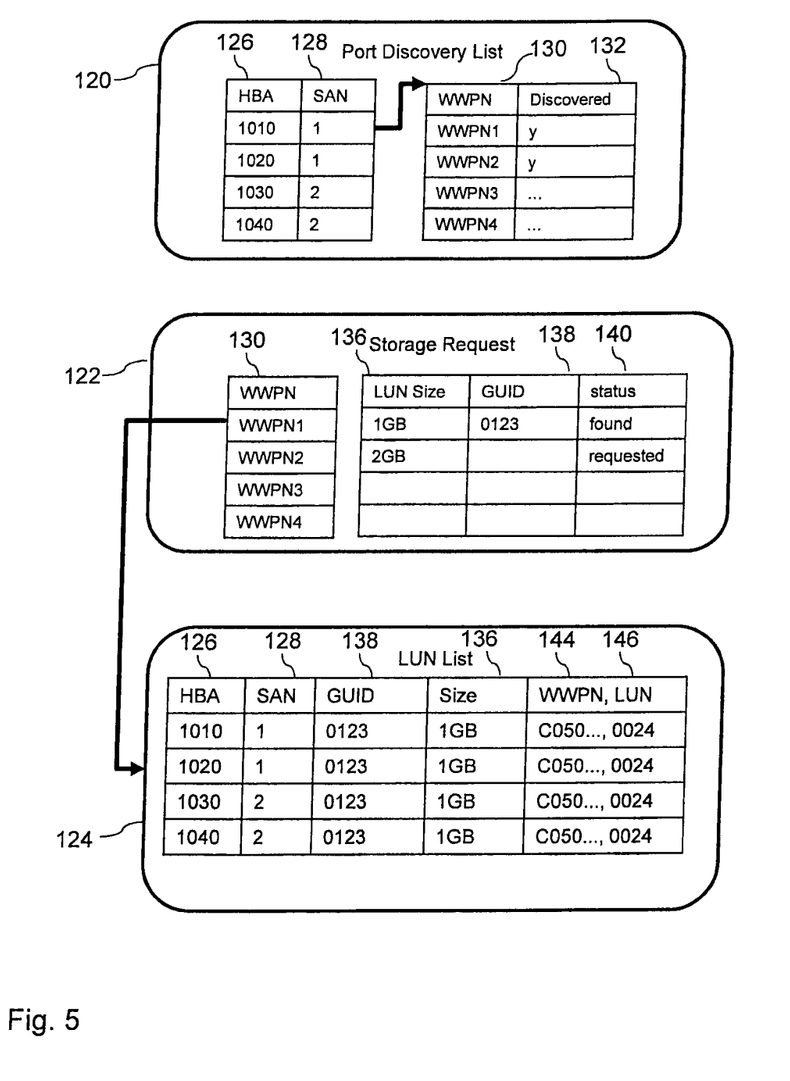
FIG. 5 depicts a port discovery list, a storage request and a LUN list as a result of the discovery process according to an embodiment of the invention.

FIG. 4 depicts one example of a flow chart for the discovery process according to an embodiment of the invention. In step S400, a storage request list 122 (FIG. 5) contains a list of all (or selected) WWPN 130 to be discovered. The storage request list 122 contains an entry for each requested LUN, attributed with a LUN size 136, and a status 140, marked with "requested". The storage request facility 74 creates a port discovery list 120 with all (or selected) host bus adapters 126 (1010, 1020, ...), as depicted in FIG. 5. For each host bus adapter 126, attributed to a storage area network 128 (1, 2, ...), a list of the world-wide unique port names 130 (WWPN1, WWPN2, ...) to be discovered is created. These world-wide unique port names 130 are used for all (or selected) storage requests 76, 78. In the port discovery list it is marked with "y" if the discovery process is successful.

If two or more physical ports connect to the same SAN, in one example, a world-wide unique port name 130 is only added to one of the physical ports for discovery. This avoids a SAN from logging out a potentially existing login of a world-wide unique port name 130, and avoids unnecessary discovery.

Next, in step S402 (FIG. 4), it is checked if the discovery is done on each host bus adapter 126 according to the host bus adapters 30, 32, 34, 36, 38, 39 of the embodiment depicted in FIGS. 1 and 2. If this is not the case, in step S408, a discovery is performed for each host WWPN 130 on the next host bus adapter 126. Then, a result of the discovery process for the host bus adapters 126 is collected in step S410. Corresponding tables are shown in FIG. 5 as a storage request list 122 and a LUN list 124. If a logical unit number 146 is found for a host WWPN 130, the host bus adapter port 126, as well as the LUN GUID 138 plus its target WWPN 144, and the LUN size 136 are added to the LUN list 124 for the host WWPN 130.

Accordingly, in the storage request list 122 if an entry exists for a LUN with a matching GUID 138, the status 140 is set to "found", and the LUN size 136 is updated. If no entry exists with a matching GUID, but an entry with a matching LUN size 136 and a status 140 set to "requested" exists, the status 140 is set to "found", and the GUID 138 is set to the GUID of the discovered LUN.

Having accomplished step S410 the flow continues with the check in step S402 for the discovery process done on each host bus adapter 30, 32, 34, 36, 38, 39. Then, if each storage request 76, 78 is checked (step S404), it is checked in step S406 if all requests are fulfilled. If this is the case, the discovery process is ended. If not all requests are fulfilled, the discovery process is restarted at the beginning with step S400.

If in step S404 not each storage request 76, 78 is checked, in step S412, the results of the discovery process are checked for each host WWPN 130 of the storage request 76, 78. Then, in step S414, if the number of LUNs plus their size found matches the storage request 76, 78, the server administrator is notified in step S416 that the request has been fulfilled. If the check in step S414 is negative, the flow continues with the step S404, if each storage request 76, 78 is fulfilled.

Figure 6:
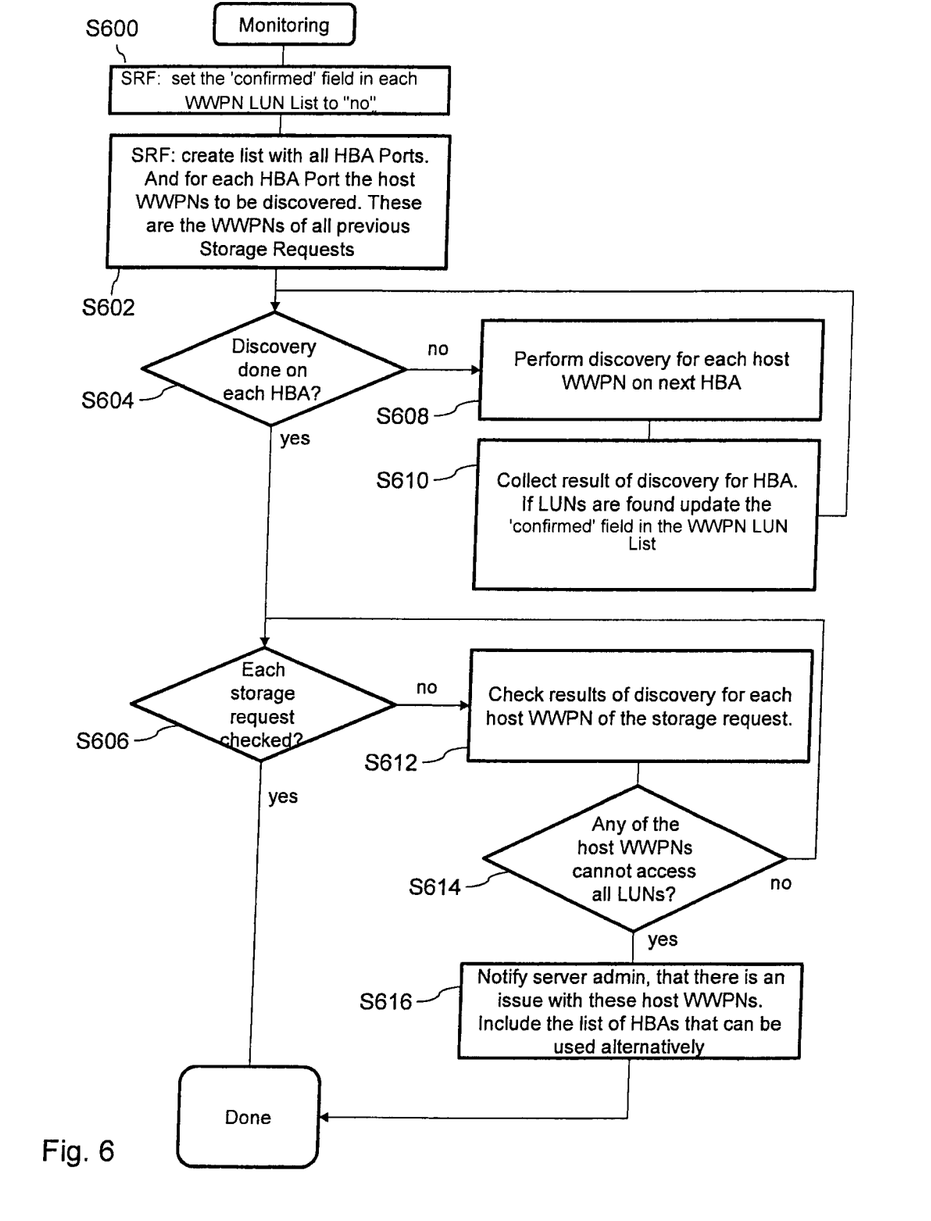
FIG. 6 depicts a flow chart for a monitoring process according to an embodiment of the invention.
Figure 7:
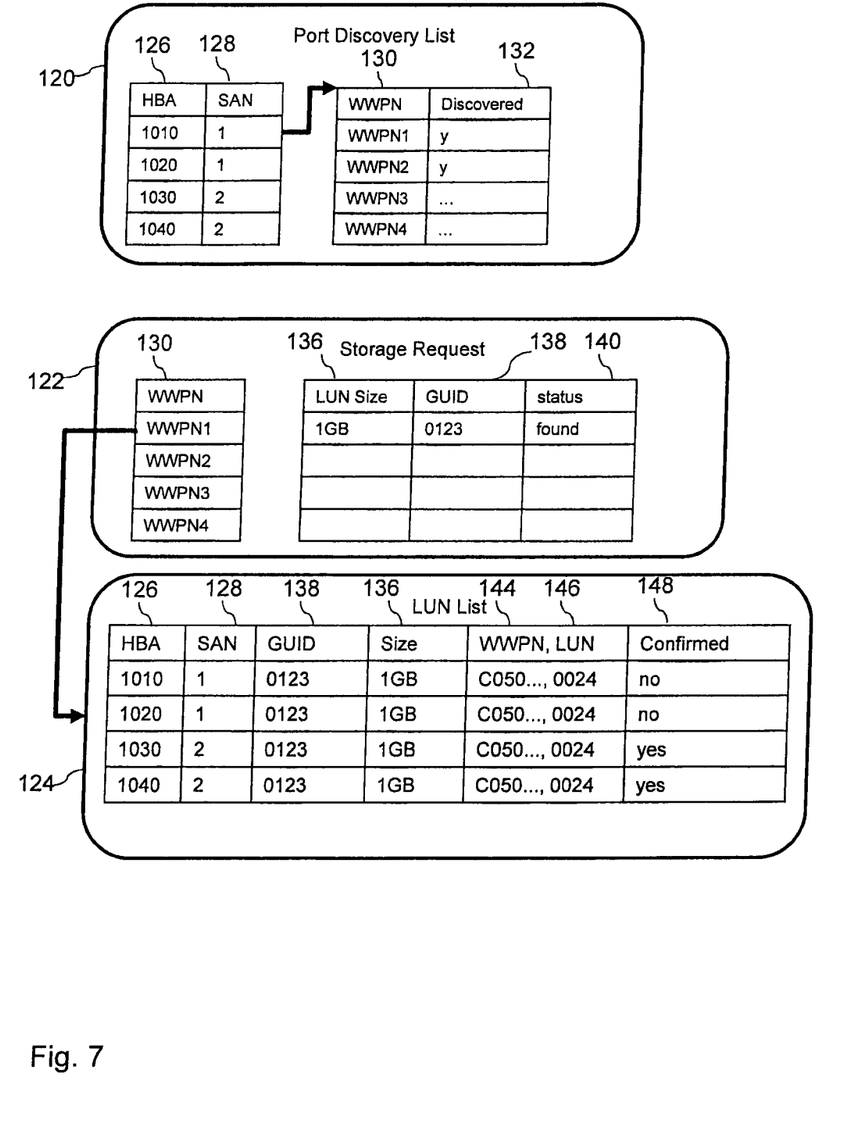
FIG. 7 depicts a port discovery list, a storage request and a LUN list as a result of the monitoring process according to an embodiment of the invention.

FIG. 6 depicts one example of a flow chart for a continuous monitoring process according to an embodiment of the invention. The monitoring process starts in step S600 by the storage request facility 74 setting the "confirmed" field 148 of each LUN list 124 as depicted in FIG. 7 to "no". Next, in step S602, the storage request facility 74 creates a list with all (or selected) host bus adapter ports 126. For each host bus adapter port 126, a list of the host WWPNs 130 is to be discovered. These are the WWPNs 130 of all previous storage requests 76, 78. Then, in step S604, it is checked if the discovery process is done on each host bus adapter 126. If this is the case, it is checked in step S606 if each storage request 76, 78 is checked. If this is the case, the monitoring process is accomplished.

If the check on discovery done on each host bus adapter 126 in step S604 is negative, in step S608 a discovery is performed for each host WWPN 130 on the next host bus adapter 126. The result of the discovery process is collected in step S610 for the host bus adapter 126. If LUNs 146 are found, the "confirmed" field in the LUN list 124 is updated.

Then, the flow is continued with step S604 with the check on the discovery done on each host bus adapter 126.

The port discovery list 120, as well as the storage request list 122 and the LUN list 124 depicted in FIG. 7 for the monitoring process are resembling the lists shown in FIG. 5 for the discovery process. The only difference is the "confirmed" field 148 of the LUN list 124.

If the check in step S606, if each storage request 76, 78 is checked, is negative, the results of the discovery process for each host WWPN 130 of the storage request 76, 78 are checked in step S612. Next, in step S614, it is checked if any of the host WWPNs 130 cannot access all LUNs 146. If the answer is negative, the flow continues with step S606 again. If the answer is positive, the server administrator is notified in step S616 that there is an issue with these host WWPNs 130. With this notification, the list of the host bus adapters 126 that can be used alternatively is included. Then, the monitoring process is finished.

Figure 8:
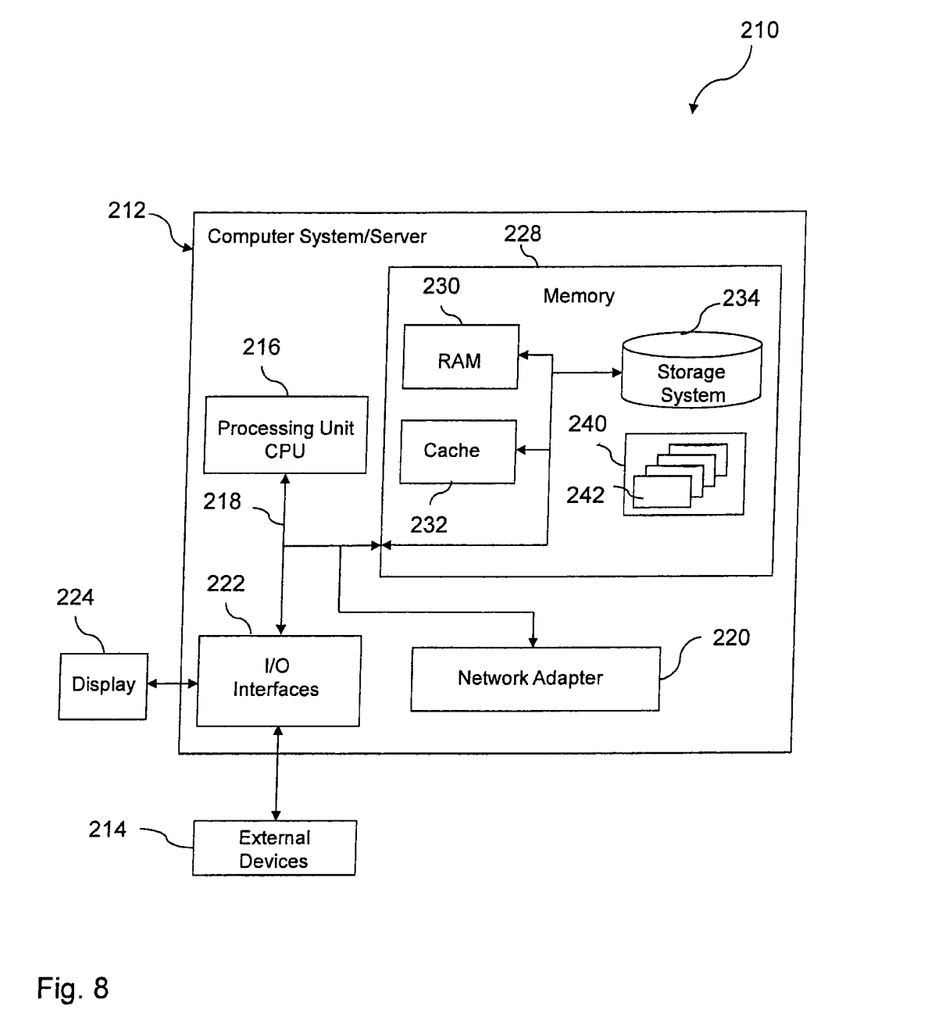
FIG. 8 depicts an example embodiment of a data processing system for executing a method according to aspects of the invention.

Referring now to FIG. 8, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

In one aspect, a data processing system is provided that includes one or more computer systems executing at least one hypervisor each. Host bus adapters on the computer system are permanently connectable to storage resources in at least one storage area network. The at least one hypervisor provides virtual instances of the host bus adapters as virtual host bus adapters, and a world-wide unique port number and a logical unit number are used to access a storage volume. The storage volume is identified, for instance, by its globally unique identifier. The data processing system is characterized by a management server comprising a management instance for evaluating a possibility of attaching storage resources to virtual machine instances generated by the hypervisor. The management instance handles storage area network requests for a group comprising at least one world-wide unique port number for a virtual host bus adapter. In response of such a request, a discovery is performed for each world-wide unique port number in the group on each host bus adapter and the collected information is then analyzed to determine the availability of the corresponding storage resources.

As one example, the storage volume is identified by its globally unique identifier (GUID), as defined by IEEE T10 and T11 standards committees.

In one embodiment, a hypervisor allows the assignment of a virtual host bus adapter to a physical host bus adapter port. A request is sent over a virtual host bus adapter, which is attributed to a host WWPN. Thus, the first WWPN of a request is implicitly given. It determines access permissions in the network, and on the storage subsystem, which is providing storage resources.

In a further aspect, a method is provided for attaching storage resources to virtual machine instances of a data processing system. The data processing system includes one or more computer systems executing at least one hypervisor each. Host bus adapters on a computer system are permanently connectable to storage resources in at least one storage area network. The at least one hypervisor provides virtual instances of the host bus adapters as virtual host bus adapters. A world-wide unique port number and a logical unit number are used to access a storage volume. The storage volume is identified, in one example, by its globally unique identifier. The method includes, for instance, a management server comprising a management instance evaluating a possibility of attaching storage resources to virtual machine instances generated by the hypervisor. The management instance handles storage area network requests for a group comprising at least one world-wide unique port number for a virtual host bus adapter. In response of such a request, a discovery is performed for each world-wide unique port number in the group on each host bus adapter for virtual host bus adapters and the collected information is then analyzed to determine the availability of the corresponding storage resources.

One or more aspects of the invention relate to a virtualized environment with a computer system or computer platforms connected to storage area networks (SAN), providing a hypervisor with support for virtual servers and Fibre Channel Protocol (FCP) storage for disk I/O processes.

According to one aspect, a request (WWPNs, number of new storage resources, including their expected size) is created for new storage resources for a group of virtual host bus adapters (vHBAs). The request is triggering the fulfillment evaluation by doing a continuous monitoring of the available storage resources for these vHBAs and by performing a discovery on each physical adapter for each WWPN. The result of the discovery is analyzed to determine if the sensed results can fulfill the request.

According to one aspect, a request (WWPNs, GUIDs of known storage resources) is created for known storage resources for a group of virtual host bus adapters (vHBAs). The request is triggering the evaluation of the availability of the storage resources for these vHBAs by performing a discovery on each physical adapter for each WWPN. The result of the discovery is analyzed through which ports and vHBAs the known storage resources can be accessed.

Thus, in one embodiment, two types of requests are described: a request for fulfillment where a storage administrator creates new storage resources and a monitoring/re-validation of already known storage resources.

In one embodiment, these steps are performed before the virtual server using the vHBAs is started or even available. This is possible because the adapter code provides an entry point to issue a discovery and so the paths to the storage resources can be discovered. This enables also the optimization of the configuration of storage resources for each virtual server at each startup by analyzing the path quality (path redundancy, utilization, . . . ) results of the performed discovery. It also enables a system wide continuous monitoring and so error indication in case storage resources are no longer reachable by storing the previous discovery result and comparing it to the current result.

Thus, one or more aspects support eliminating the dependency between system and SAN configuration, concerning, e.g., adding/removing virtual servers, adding/removing host bus adapters (HBAs), planning for virtual server migration, adding/removing, or sharing storage resources. Further, one or more aspects support the management of systems comprising a large number of virtual host bus adapters (vHBAs), exhibiting 16 hex digit WWPNs, as well as the server administration for the creation, assigning and managing of individual vHBAs. Further, one or more aspects exhibit advantages where separate management domains (server and SAN) exist and, for instance, where a server configuration only partly reflects a SAN configuration.

In one or more aspects, the user only has to specify a group of virtual servers, and host bus adapters. The system creates vHBAs/WWPNs, on different servers, if required. This action is taken independently of a virtual server, which means activation of a vHBA's, e.g., undertaken independently of a virtual server. That is, vHBA connectivity can be validated on a physical server which is only a potential target for a virtual server migration. The virtual server only describes, for instance, requirements towards the storage resources that are to be accessed. The system picks and assigns a vHBA as the virtual server requires it. vHBAs are managed as a group, not as individual vHBAs. They reflect the SAN configuration and it allows the system to validate that a group of vHBAs indeed has access to the same group of storage resources. This is much more convenient than having the administrator implicitly and/or manually group vHBAs and validate access.

In one or more aspects, only minor input from a server administrator is used to create and manage vHBAs for virtual servers. One basis of the method exhibits a group of storage resources and virtual servers, where there is to be access to a network or network resources, and HBAs are used to access the network resources. A group of vHBAs is created for the group of storage resources, instead of having an administrator to create them individually as in the state of the art. vHBAs are managed as a group. Information is added to the group of vHBAs that allows relating server and SAN configuration.

In a further aspect, a computer program product is provided for attaching storage resources to virtual machine instances. A data processing system includes one or more computer systems executing at least one hypervisor each. Host bus adapters on the computer system are permanently connectable to storage resources in at least one storage area network. The at least one hypervisor provides virtual instances of the host bus adapters as virtual host bus adapters. A world-wide unique port number and a logical unit number are used to access a storage volume. The storage volume is identified, in one example, by its globally unique identifier (as defined by IEEE T10 and T11 standards committees). The computer program product includes a computer readable storage medium having program instructions embodied therewith. The program instructions are executable by a computer to cause the computer to perform a method including a management server including a management instance evaluating a possibility of attaching storage resources to virtual machine instances generated by the hypervisor. The management instance handles storage area network requests for a group comprising at least one world-wide unique port for a virtual host bus adapter. In response of such a request, a discovery is performed for each worldwide unique port number in the group on each host bus adapter for virtual host bus adapters and the collected information is then analyzed to determine the availability of the corresponding storage resources.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A data processing system for attaching selected storage resources to one or more virtual machine instances, the data processing system comprising:
    a memory; and
    a processor in communication with the memory, wherein the data processing system is configured to perform a method, said method comprising:
        obtaining, by a management instance of a management server of the data processing system, a storage area network request for a group comprising at least one world-wide unique port number for one or more virtual host bus adapters, wherein a virtual host bus adapter of the one or more virtual host bus adapters is a virtual instance of a host bus adapter of one or more host bus adapters of a computer system of the data processing system, the host bus adapter to couple the computer system to one or more storage resources of one or more storage area networks, the at least one world-wide unique port number to be used to access at least one storage resource of the one or more storage resources of at least one storage area network of the one or more storage area networks;
        initiating, based on the storage area network request that is obtained, discovery for each world-wide unique port number of the at least one world-wide unique port number in the group on the one or more host bus adapters of the computer system to collect information;
        analyzing the information collected to determine availability of the selected storage resources to attach to the one or more virtual machine instances generated by a hypervisor of the computer system; and
        initiating, based on the analyzing the information collected based on initiating discovery for each world-wide unique port number of the at least one world-wide unique port number in the group on the one or more host bus adapters, configuring at least one virtual host bus adapter of the one or more virtual host bus adapters to attach one or more selected storage resources of the selected storage resources to at least one virtual machine instance of the one or more virtual machine instances.

2. The data processing system according to claim 1, wherein the method further comprises:
    obtaining the storage area network request by the management instance on each startup of a virtual machine instance of the one or more virtual machine instances in order to optimize selection of at least one host bus adapter of the one or more host bus adapters for at least one virtual host bus adapter of the one or more virtual host bus adapters of the virtual machine instance; and
    analyzing the information collected to determine a best available host bus adapter in dependence of path quality criteria.

3. The data processing system according to claim 2, wherein the path quality criteria comprise at least one of path redundancy and utilization of the at least one host bus adapter of the one or more host bus adapters.

4. The data processing system according to claim 1, wherein the storage area network request comprises information on storage requirements, including information on a number and storage size of the selected storage resources to be requested.

5. The data processing system according to claim 1, wherein the method further comprises automatically determining when the storage area network request has been fulfilled.

6. The data processing system according to claim 1, wherein the initiating discovering comprises triggering a discovery process through at least one host bus adapter of the one or more host bus adapters for at least one virtual host bus adapter of the one or more virtual host bus adapters of a virtual machine instance of the one or more virtual machine instances.

7. The data processing system according to claim 1, wherein the method further comprises performing continuous monitoring to determine changes in availability of a selected storage resource of the selected storage resources.

8. The data processing system according to claim 1, wherein the method further comprises alerting the hypervisor based on requirements of the storage area network request being fulfilled in discovery.

9. The data processing system according to claim 1, wherein the method further comprises updating the storage area network request based on information on new virtual host bus adapters being provided to the management instance.

10. The data processing system according to claim 1, wherein the method further comprises periodically repeating discovery to update information on one or more storage resources of the selected storage resources.

11. The data processing system according to claim 1, wherein the method further comprises obtaining the storage area network request by the management instance from the hypervisor before a virtual machine instance of the one or more virtual machine instances is generated by the hypervisor.

12. A computer program product for attaching selected storage resources to one or more virtual machine instances, the computer program product comprising:
  a computer readable storage medium readable by a processing circuit and storing instructions for performing a method comprising:
    obtaining, by a management instance of a management server of the data processing system, a storage area network request for a group comprising at least one world-wide unique port number for one or more virtual host bus adapters, wherein a virtual host bus adapter of the one or more virtual host bus adapters is a virtual instance of a host bus adapter of one or more host bus adapters of a computer system of the data processing system, the host bus adapter to couple the computer system to one or more storage resources of one or more storage area networks, the at least one world-wide unique port number to be used to access at least one storage resource of the one or more storage resources of at least one storage area network of the one or more storage area networks;
    initiating, based on the storage area network request that is obtained, discovery for each world-wide unique port number of the at least one world-wide unique port number in the group on the one or more host bus adapters of the computer system to collect information;
    analyzing the information collected to determine availability of the selected storage resources to attach to the one or more virtual machine instances generated by a hypervisor of the computer system; and
    initiating, based on the analyzing the information collected based on initiating discovery for each world-wide unique port number of the at least one world-wide unique port number in the group on the one or more host bus adapters, configuring at least one virtual host bus adapter of the one or more virtual host bus adapters to attach one or more selected storage resources of the selected storage resources to at least one virtual machine instance of the one or more virtual machine instances.

13. The computer program product according to claim 12, wherein the method further comprises:
  obtaining the storage area network request by the management instance on each startup of a virtual machine instance of the one or more virtual machine instances in order to optimize selection of at least one host bus adapter of the one or more host bus adapters for at least one virtual host bus adapter of the one or more virtual host bus adapters of the virtual machine instance; and
  analyzing the information collected to determine a best available host bus adapter in dependence of path quality criteria.

14. The computer program product according to claim 12, wherein the method further comprises performing continuous monitoring to determine changes in availability of a selected storage resource of the selected storage resources.

15. The computer program product according to claim 12, wherein the method further comprises updating the storage area network request based on information on new virtual host bus adapters being provided to the management instance.

16. The computer program product according to claim 12, wherein the method further comprises periodically repeating discovery to update information on one or more storage resources of the selected storage resources.

17. A computer-implemented method of attaching selected storage resources to one or more virtual machine instances, the computer-implemented method comprising:
  obtaining, by a management instance of a management server of the data processing system, a storage area network request for a group comprising at least one world-wide unique port number for one or more virtual host bus adapters, wherein a virtual host bus adapter of the one or more virtual host bus adapters is a virtual instance of a host bus adapter of one or more host bus adapters of a computer system of the data processing system, the host bus adapter to couple the computer system to one or more storage resources of one or more storage area networks, the at least one world-wide unique port number to be used to access at least one storage resource of the one or more storage resources of at least one storage area network of the one or more storage area networks;
  initiating, based on the storage area network request that is obtained, discovery for each world-wide unique port number of the at least one world-wide unique port number in the group on the one or more host bus adapters of the computer system to collect information;
  analyzing the information collected to determine availability of the selected storage resources to attach to the one or more virtual machine instances generated by a hypervisor of the computer system; and
  initiating, based on the analyzing the information collected based on initiating discovery for each world-wide unique port number of the at least one world-wide unique port number in the group on the one or more host bus adapters, configuring at least one virtual host bus adapter of the one or more virtual host bus adapters to attach one or more selected storage resources of the selected storage resources to at least one virtual machine instance of the one or more virtual machine instances.

18. The computer-implemented method according to claim 17, further comprising:
  obtaining the storage area network request by the management instance on each startup of a virtual machine instance of the one or more virtual machine instances in order to optimize selection of at least one host bus adapter of the one or more host bus adapters for at least one virtual host bus adapter of the one or more virtual host bus adapters of the virtual machine instance; and
  analyzing the information collected to determine a best available host bus adapter in dependence of path quality criteria.

19. The computer-implemented method according to claim 17, further comprising performing continuous monitoring to determine changes in availability of a selected storage resource of the selected storage resources.

20. The computer-implemented method according to claim 17, further comprising updating the storage area network request based on information on new virtual host bus adapters being provided to the management instance.

\* \* \* \* \*